United States Patent [19]
Stevens

[11] 3,727,759
[45] Apr. 17, 1973

[54] GRAIN CLEANER FOR AUGER-EQUIPPED ELEVATORS

[76] Inventor: Roy Stevens, P.O. 1, Glenburn, N. Dak. 58740

[22] Filed: Jan. 29, 1971

[21] Appl. No.: 111,023

[52] U.S. Cl. ................209/283, 198/213, 209/372, 209/405
[51] Int. Cl. ..............................................B07b 1/06
[58] Field of Search......................209/383, 358, 282, 209/372, 405; 198/213

[56] References Cited

UNITED STATES PATENTS

| | | | |
|---|---|---|---|
| 2,706,046 | 4/1955 | Andrews | 209/283 |
| 800,797 | 10/1905 | Cross | 209/283 X |
| 821,777 | 5/1906 | Benjamin | 209/405 |

*Primary Examiner*—Frank W. Lutter
*Assistant Examiner*—William Cuchlinski, Jr.
*Attorney*—Clarence A. O'Brien and Harvey B. Jacobson

[57] ABSTRACT

A ready-to-use attachment for a conventional-type small grain elevator. The tubular auger-equipped housing has an elongated slot cut in its bottom where desired. The attachment comprises an elongate box-like trough commensurate in size with the size and shape of the slot. The receptacle portion of this trough is capable of trapping weed seeds and extraneous matter. One end of the trough is provided with a depending discharge spout. The side walls have outwardly flaring trough positioning flanges. An insertable and removable screen of suitable mesh is fitted and seated in the trough and hinged attaching straps embrace the housing and are detachably bolted in place.

2 Claims, 4 Drawing Figures

Roy Stevens
INVENTOR.

BY Clarence A. O'Brien
and Harvey B. Jacobson
Attorneys

GRAIN CLEANER FOR AUGER-EQUIPPED ELEVATORS

This invention relates, broadly stated, to auger-equipped grain elevators, and, more specifically, to means which is coordinated with the elevator housing and by way of which weed seeds and extraneous material is separated from the grain and is conveniently disposed of in a feasible and acceptable manner.

It is common in the art to provide a grain cleaner and separator attachment which leads itself to use on a conventional grain auger or elevator and which is structurally and functionally such that unwanted particles and extraneous matter smaller than the size of the grain desired are trapped and properly separated.

For background purposes the reader, if so desired, can refer to the grain handling machine shown in the Charlie Raney U.S. Pat. No. 2,408,952 and which teaches the use of a depending screened funnel having a material discharge neck or spout. Also, the idea of utilizing an attachment for a grain auger which embodies seed screening facilities the Elmer L. Bakke U.S. Pat. No. 3,251,467 can be referred to. Other patents pertaining to the category of inventions under advisement could be cited but are deemed to be neither pertinent nor significant.

As will be hereinafter more fully appreciated the only alteration in the commonly used elevator has to do with cutting out a slot at a predetermined place in the bottom or underneath median portion of the housing of the auger-equipped elevator. It is with this slotted bottom that the present invention, a self-contained ready-to-use separator attachment, is employed.

Experimental use has repeatedly shown the attachment is simple, practical, easy to install and remove and well serves the purposes for which it has been devised and successfully used.

Briefly, the attachment comprises an elongated box-like lightweight but durable trough. This trough provides a receptacle portion which functions to receive and temporarily collect and discharge weed seeds and extraneous matter. The trough, being inclined when attached, functions to cause the loose collected material to gravitate toward what may be called the lower end of the trough. At this end the trough is provided with a discharge opening and an aligned depending neck which constitutes a discharge spout. The longitudinal side walls of the trough have upper lengthwise edges provided with corresponding lengthwise outwardly flaring flanges which contact the convex outer surface of the auger housing and are attached and maintained in effective place by way of arcuate strap members which are hinged on the trough and have upper ends which are bolted together. The receptacle portion of the trough is provided with internal brackets or braces which serve to seat and cradle an elongated arcuate screen, that is, a screen which is lined up with a slot and which serves to permit the passage of weed seeds and small particles for collection and ultimate disposition.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4:
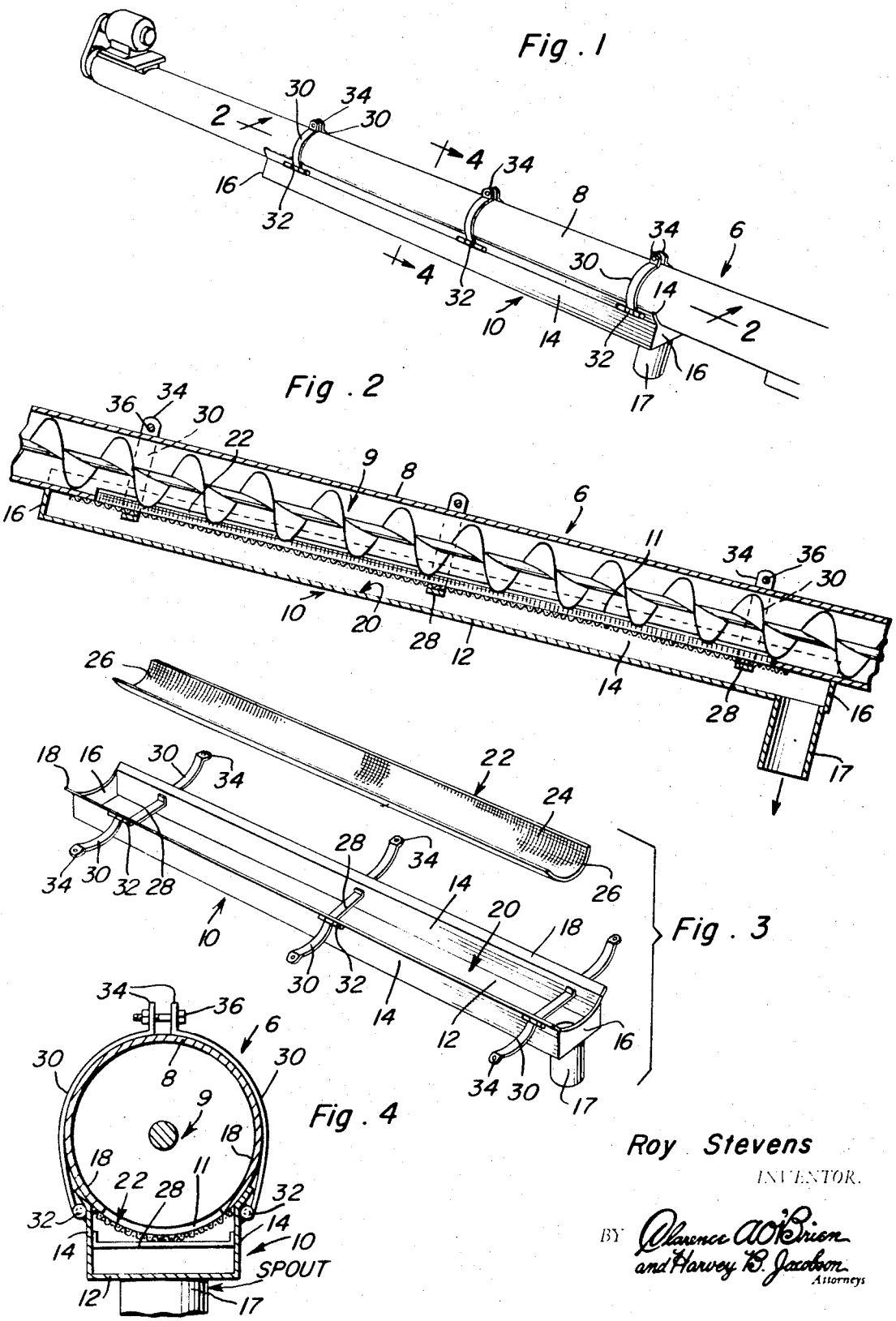
FIG. 1 is a view in perspective showing a fragmentary portion of the aforementioned grain elevator or auger, as it is sometimes called, and showing, more particularly, the attachment and how it is constructed and mounted on the slotted housing.
FIG. 2 is an enlarged detailed view with parts in section and elevation taken approximately on the plane of the section line 2—2 of FIG. 1 looking in the direction of the indicating arrows.
FIG. 3 is an exploded perspective view showing the two principal component parts of the attachment, that is, the trough and the complemental separating screen.

And FIG. 4 is an enlarged detailed section taken approximately on the plane of the line 4—4 of FIG. 1 looking in the direction of the arrows.

With reference now to the views of the drawing the aforementioned elevator, generally stated, is denoted by the numeral 6 and is here designated as a common or conventional type. Accordingly, it embodies an elongated housing 8 which as shown in FIGS. 2 and 4 has its median bottom portion provided with an elongated slot 11. It is with this slotted bottom portion that the cleaner attachment is oriented and cooperatively associated. The attachment comprises a sheet material lightweight but durable elongated box-like trough 10 having a bottom wall 12, longitudinal side walls 14 and transverse connecting walls 16. The upper lengthwise edges of the side walls are provided with co-extensive outwardly flared lip-like flanges 18 which are disposed in coplanar relationship and are thus adapted to bear against and contact the convex surfaces of the housing 8 on opposite sides of the slot means 11. With this construction a comparatively shallow receptacle portion 20 is provided and it is this portion which receives and traps the disposable seeds and extraneous material. The replaceable screen is denoted by the numeral 22 and may be said to be insertable and removable and is channel shaped in cross-section as at 24, and has open ends 26. This screen, which may be of suitable mesh or gauge, is proportional with the receptacle portion and in fact is seated in the receptacle portion and is held in position by way of transverse longitudinally spaced brackets or braces 28. The braces are mounted between the side walls and are spaced above the bottom wall and the convex part of the screen is cradled or seated thereon as brought out in FIGS. 2 and 4 in particular. The screen is of a length and curvature that it conformingly fits against the exterior surfaces of the housing and spans and covers the slot 11.

In addition to the trough and the screen means is provided for attaching the trough to the housing. This means may be of some construction other than that specifically shown. The means which is currently and satisfactorily in use comprises arcuate embracing and attaching straps which are denoted by the common numeral 30. The respective straps have lower end portions hinged in place on the side walls of the trough as at 32. The straps swing up and toward each other and embrace the cylindrical housing 8 and are provided at their free ends with ear-like lugs 34 which swing together as shown in FIG. 4 and are separably joined by bolt and nut means 36.

As has already been pointed out the elevator 6 is of a so-called conventional type in that it embodies the aforementioned elongated tubular housing or casing and a screw-type anger or conveyor 9 which is located on the interior thereof and is appropriately rotated in the manner illustrated in FIG. 2. It is only necessary to cut a slot in the underneath side at the desired point as shown in FIG. 1. The slot is of requisite length and width to accommodate the screen 22 and the attachable trough 10. The screen is mounted in place and supported on the seating or adapter brackets 28. The screen is of a curvature that conforms and fits with requisite nicety in place when lined up with the slot. The attaching and retaining straps 30 are brought into position by encircling the coacting portions of the housing 6 and are bolted together whereby to hold the screen and trough in place for use in what is believed to be a substantially self-evident manner. The discharge spout at the rearward end of the bottom wall 12 is denoted by the numeral 17.

It is submitted that by considering FIG. 3 in conjunction with the description and particularly in relation to FIGS. 1, 2 and 4, a clear understanding of the subject matter of the invention will be had. The manner of use of the attachment and the end result attained appear to be clear. Accordingly, a more extended description is deemed to be unnecessary The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A self-contained readily applicable and removable grain cleaning attachment for an elongated tubular auger-equipped grain housing having a bottom side with a discharge slot for weed seeds and extraneous matter, said attachment comprising: an elongated shallow open top box-like trapping and disposal trough embodying a bottom wall marginally surrounded by united upstanding longitudinal side walls and transverse end walls interconnecting said side walls, said bottom wall being provided at one end of the receptacle portion of the trough with a depending integral open-ended neck providing a discharge spout, said side walls having free upper lengthwise edges provided with complemental outwardly flaring lip-like adapter flanges, said flanges being commensurate in length with the length of said side walls and constructed and arranged to abut and firmly contact surface portions of the aforementioned housing along opposite lengthwise edges of said slot, the upper edges of said end walls being arcuately notched and constructed and arranged to conformingly embrace coacting exterior surface portions of the housing, a plurality of longitudinally spaced transverse adapter brackets having ends thereof fixed to interior surfaces of said side walls and located and confined in said receptacle portion and spaced above said bottom wall and constituting screen seating and supporting brackets, a manually insertable and removable channel-shaped open ended screen having a convex bottom portion cooperatively fitted into said receptacle portion and perched and removably seated on the respectively cooperable brackets and oriented and positioned by said brackets, and means for suspending and retentively attaching said trough to the aforementioned housing.

2. The structure defined in and according to claim 1 and wherein said attaching means comprises pairs of oppositely disposed arcuate attaching straps, said straps having lower ends hinged to exterior surfaces of said side walls and having upper free ends, said upper free ends terminating in assembling and retaining ears, and nut-equipped bolts cooperable with the respectively paired ears and serving to mount and retain the trough in a given operating position on said housing.

* * * * *